Jan. 22, 1935.   H. A. SNYDER   1,988,668
COUPLING ORGANIZATION FOR RODS AND LIKE ELEMENTS
Filed May 15, 1933
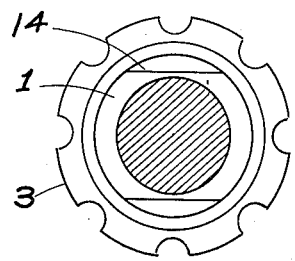
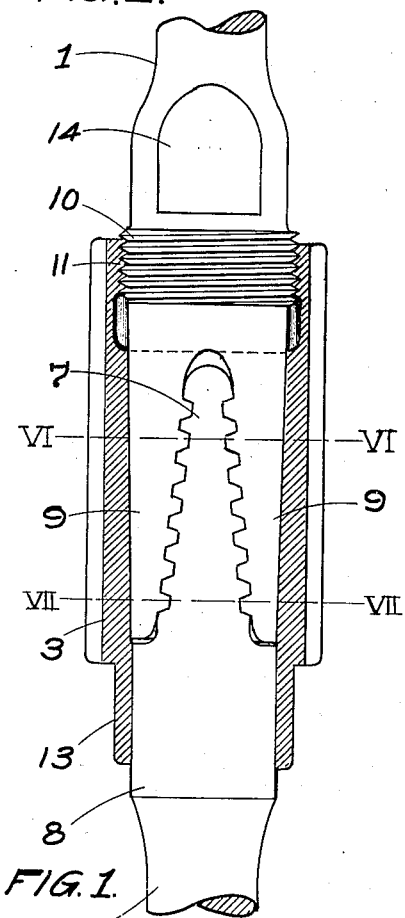
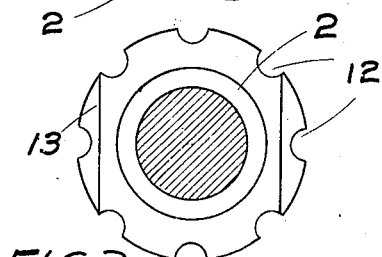
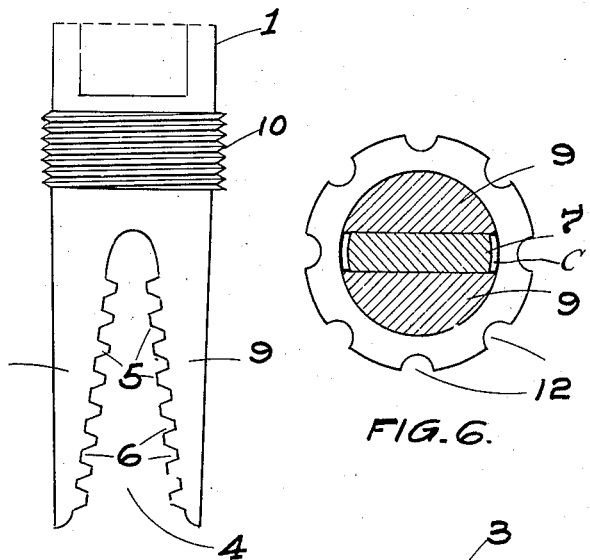
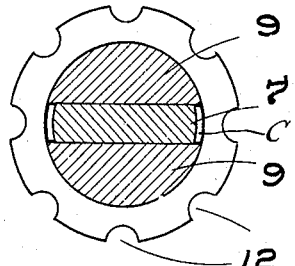
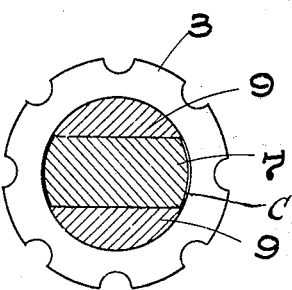
Inventor
Harry A. Snyder
By Edward R. Inman
Attorney Patented Jan. 22, 1935

UNITED STATES PATENT OFFICE 1,988,668

COUPLING ORGANIZATION FOR RODS AND LIKE ELEMENTS

Harry A. Snyder, Franklin, Pa.

Application May 15, 1933, Serial No. 671,086

7 Claims. (Cl. 287—105)

This invention relates to improvements in coupling organizations for rods and like elements.

One field of use to which this improved type of coupling is especially well adapted is, its application to the joints of sucker rods for deep well pumps; it may also be used as a coupling for line shafts in the transmission of power; furthermore, it is applicable to tension rods in all kinds of structural work; its use is practically unlimited in the coupling of rods which are arranged in longitudinal alignment, regardless of the type of structure in which the rods are employed, and it is pointed out that this organization is equally well adapted to resist both a longitudinally applied strain and a torsionally applied strain.

Reference is hereby made to my co-pending application Serial No. 651,141, filed January 11, 1933, for Coupling organizations for rods.

The construction of my improved coupling organization is clearly shown in the accompanying drawing.

Briefly stated this coupling organization, consists of the two rod ends to be coupled, and a third member termed the retaining sleeve, or the aligning member, either of which terms is suitable. The function of this third member is, primarily, to cause and thereafter to maintain the alignment of the coupled members and to lock them in their coupled relation.

In the equipment of a rod with my improved coupling organization, it is desirable to so proportion the elements of the coupling that it will withstand, without distortion, at least as much longitudinal or torsional strain as the body of the rod will withstand, and in some cases this requires that the diameter of the coupling elements must be increased as compared with the diameter of the rod to which the joint is applied; as illustrated in the drawing, rods having a diameter of seven-eighths of an inch, are equipped with a coupling in accordance with my inventive idea, and in order to produce a coupling that will withstand a longitudinal stress of at least 50,000 pounds without distortion, the immediate ends of the rods are enlarged or upset, such upsetting is not, however, required in all cases, beyond what is necessary to form a threaded feature of one of the coupled ends, or a suitable tapered area without producing consequent weakness.

My improved coupling organization is clearly illustrated in the accompanying drawing in which:

Fig. 1 is an elevation of two rod ends in their coupled relation in which the aligning member, or retaining sleeve is shown in longitudinal section.

Fig. 2 is an end view of the adjacent end of Fig. 1.

Fig. 3 is an end view of the adjacent end of Fig. 1.

Fig. 4 is an elevation of the gap end or lower end of the upper member.

Fig. 5 is an elevation of the tenon end or upper end of the lower member.

Fig. 6 is a transverse section on line VI—VI of Fig. 1.

Fig. 7 is a transverse section on lines VII—VII of Fig. 1.

For the sake of clearer illustration, the sleeve members in Figs. 6 and 7 are not section lined.

The construction shown in the drawing is substantially as follows:

This coupling organization comprises three members, namely, a rod end 1, a rod end 2 and an aligning and retaining member 3.

Member 1, which is termed the gap, or upper member, is provided with a gap 4 which extends longitudinally thereinto; the opposing walls of said gap are disposed at an outwardly-diverging angle to each other and to the axis of the rod. Said walls are formed into the semblance of the structure which is known in the art of gear making as a rack, consisting of the lands 5, 5 and the intermediate grooves 6, 6; said lands and grooves need not have the true gear tooth or rack form generally ascribed to these features; the term rack being here used as one of wide scope and applied to a form of mechanical construction that is generally familiar in the mechanical field, also being one of suitable application in the present case.

Member 2, which is termed the lower or tenon member, is provided with a tenon 7 which, especially in respect to said rack features, is a counterpart of said gap and may be assembled thereinto in the coupling position by being laterally inserted; the width of said tenon, is somewhat less than the diameter of the gap member at its lower, smaller end, thus producing the clearance C, as will be clearly seen by an inspection of Figs. 6 and 7; the purpose of this particular variance in dimensions will be presently pointed out; said tenon member 2, adjacent the gap features is provided with a cylindrical portion 8 of uniform diameter, which is termed the aligning section.

The lower end of the rod end 1, previously to the formation of the gap 4 therein, is formed into a downwardly converging taper the included angle of which is approximately five-eighths of an inch per foot; this member, at its lower extremity has a diameter which is slightly greater than the diameter of the adjacent section 8 of member 2. It will be noted that the formation of the gap 4 imparts to the walls 9 upon each side thereof the semblance of jaws.

Above said gap 4 and jaws 9, member 1 is provided with a screw threaded portion 10 for cooperation with an internal screw thread 11 in the upper end of said sleeve 3.

The conformation and relative diameters of said tapered portions of member 1 and the corresponding portions of the walls of the bore of sleeve 3, are such that, as said sleeve is screwed up to its service or assembly position, circumferentially compressive action is exerted by the tapered portion of the walls of said sleeve upon the adjacent counterpart periphery of the jaws of said gap, whereby said jaws 9 are caused to firmly grip the contacting faces of tenon 7 which occupies said gap 4; this gripping action, together with a close fit of the adjacent portion of the bore of sleeve 3 with the periphery of section 8 of member 2, produces a perfectly aligned and very rigid joint in which there is no relative interplay of the coupled members.

It is now pointed out that the reason for making the diameter of section 8 of member 2 somewhat less than the diameter of the adjacent end of section 1 whereby the clearance C is produced, is to insure the condition that none of the compressive action of the internal walls of sleeve 3 will be ineffectually exerted upon tenon 7, thus preventing their effectual compressive action upon the periphery of said jaws 9; in the construction as illustrated all of said compressive action, is exerted upon the periphery of said jaws, as indicated in Figs. 6 and 7; and furthermore, the construction of all of the joint members is such that when said sleeve is being screwed up to its service position no longitudinally directed force is exerted by said sleeve upon the tenon member 7, as such a force would tend to separate the weight sustaining faces of the lands 5 of the gap and the tenon, and would so separate them to a sufficient degree that, when the weight of the coupled rods of a well were exerted upon the joint their weight would be such as to cause a re-seating of said weight-sustaining faces and a consequent looseness in the joint which looseness would rapidly increase in the pumping operation of the rods.

It is furthermore pointed out that said fit between the lower portion of sleeve 3 and the periphery of section 8 is sufficiently close as to form at this point, a joint that is impervious to the entrance of fluid, fine silt or any element which might tend to decrease the efficiency of or promote wear between any of the internal members or features of the joint.

When this coupling organization is applied to sucker rods, sleeve 3, upon its periphery, is provided with longitudinally disposed grooves 12, for the purpose of providing a greater area of space between the periphery of said sleeve and the adjacent wall of the tubing in which the sucker rod works, for the passage of fluid as it is pumped from the well.

Wrench-flats as 13 are milled upon the lower end of said sleeve for engagement with a wrench for securing said sleeve in its service position.

Wrench-flats are also provided at 14 upon member 1 for the application of a wrench when said sleeve is being actuated into its service position.

In place of the wrench flats 13 on the sleeve 3 a spanner wrench may be used which is provided with a lug to engage said grooves 12. After the sleeve 3 is unscrewed and the coupled ends of the rod are severed, said sleeve may be readily slipped off and removed from either of said ends; were it not so removable, it would be the cause of considerable trouble and inconvenience in finishing and machining the rod ends, as well as in their handling, storage and equipment, and a likelihood of damage and distortion to the sleeve itself, especially in oil field use.

In the specification and claims where the terms "upper", "lower" are used in respect to the relative positions of sections 1 and 2, it should be understood that these terms relate to the drawing merely, and are not intended to apply to the organization, when in actual use, wherein it may be relatively inverted, instead of being positioned as illustrated.

In many classes of service, the threads 10 and 11 of this form coupling organization may be dispensed with especially where the organization is disposed in an inverted, horizontal or any intermediate inclination, as compared with the position shown in the drawing; among such classes of service may be mentioned the stay-rods in aeroplanes and like structures and in some classes of architectural work; in some cases where said threads are omitted, it may be found desirable to apply a thin coat of red or white lead to the peripheries and cooperating features and faces of the joint members before the sleeve is applied to its service position.

I claim the following:

1. A coupling organization for rods and like elements consisting in combination of members which are provided with cooperating coupling features, namely, two ends to be coupled and a sleeve adapted to be positioned over the coupled joint so as to maintain said other two elements in coupled relation; one of said ends being provided with an external screw thread positioned in spaced relation to its coupling extremity also with a gap extending longitudinally thereinto, the portion of said end intermediate said thread and said extremity being formed into a downwardly converging taper; the other of said ends having a diameter which is slightly smaller than the extremity of said first mentioned end formed into a counterpart tenon for lateral insertion into and occupancy of gap, the contacting walls of said gap and said tenon being each provided with a series of lands and grooves for interengagement so as to withstand strains longitudinally exerted upon the coupled joint, the walls of the bore of said sleeve being in close conformity to and cooperative engagement with said screw thread and with the peripheral walls of the jaws of said gap so as to exert inwardly directed compressive force thereupon; the construction of all the members of said joint being such that no longitudinally directed force is exerted upon said tenon member by said sleeve.

2. A coupling organization for rods, shafting and like elements, consisting in combination of elements which are provided with interengaging and cooperative coupling features as follows; two ends to be coupled together and a sleeve positionable over the interengaged ends whereby their axial alignment is insured and their interengagement maintained; one of said ends being provided with a downwardly converging, tapered extremity and above said tapered portion with an external thread of greater diameter than the largest diameter of said tapered portion, said tapered portion being provided with a gap extending longitudinally thereinto, the inner, opposing walls of which gap are transversely parallel and longitudinally, downwardly divergent, also provided upon their inner faces with a series of alternately positioned lands and grooves; the other of said ends having a uniform diameter which is approximately two-thousandths of an inch smaller than the extremity of said first mentioned end, this second end being formed into a counterpart tenon so as to be laterally inserted into said gap, said sleeve being positionable over the joint thus formed, the bore of said sleeve being in conformity to and close contact with the external walls of the jaws of said gap and with said external screw thread adjacent thereto, as and for the purposes set forth; the construction of all of the members of said coupling being such that no longitudinally directed force is exerted by said sleeve upon the tenon member of the joint.

3. A coupling organization for rods and the like consisting in the combination of elements provided with features for coupling assembly, namely, two rod ends to be coupled and a sleeve positionable over the resulting joint to maintain said assembly; one of said ends being provided with a tapered portion which converges toward its extremity, also having a gap which extends longitudinally thereinto with its walls disposed in transversely parallel, upwardly converging relation, said walls being provided with transversely extending grooves and lands; the other of said rod ends having a diameter which is a minute fraction of an inch less than the diameter of the extremity of said first end and formed into a counterpart tenon for lateral insertion into and occupancy of said gap; said sleeve being positionable over said ends when in their assembled relation whereby circumferential compression is exertable upon the periphery of the jaws of said first member, so that they are caused to firmly grip said tenon therebetween and to assure true alignment of the coupled members; there being a clearance between the tapered portion of the bore of said sleeve and the adjacent walls of said tenon when said joint is in its coupled relation, as and for the purpose set forth.

4. A coupling organization for rods and the like consisting in the combination of elements provided with features for coupling assembly, namely, two rod ends to be coupled and a sleeve positionable over the resulting joint to maintain said assembly; one of said ends being provided with a tapered portion which converges toward its extremity, also having a gap which extends longitudinally thereinto with its walls disposed in transversely parallel, upwardly converging relation, said walls being provided with transversely extending grooves and lands, there being also an external thread upon said end above and in proximity to the upper end of said gap; the other of said rod ends having a diameter which throughout its length is uniform and is a minute fraction of an inch less than the diameter of the extremity of said first end but is otherwise formed into a counterpart tenon for lateral insertion into and occupancy of said gap; said sleeve being positionable over said ends when in their assembled relation and provided within its upper end with an internal thread for cooperation with said external thread for the actuation of said sleeve in the upward direction, whereby circumferential compression is exertable upon the periphery of the jaws of said first member, so that they are caused to firmly grip said tenon therebetween and to assure true alignment of the coupled members.

5. A coupling organization for rods and the like consisting in the combination of elements having features thereof as follows: the two ends to be coupled by a laterally produced engagement with each other and a sleeve positionable over the joint thus formed whereby said engagement and coupled relation are maintained; one of said ends being provided with a gap extending longitudinally thereinto and having inwardly converging walls formed into alternate, transversely extending grooves and lands, the external walls of said gap being formed into an upwardly diverging taper; the other of said ends having a uniform diameter throughout its length but is otherwise formed into a counterpart tenon for lateral insertion into the occupancy of said gap whereby the coupled relation of said ends is attained; said sleeve being positionable over the coupled joint thus formed whereby the walls of said gap may be caused to firmly grip said tenon therebetween and also insure and maintain the alignment of the ends so coupled.

6. A coupling organization for rods and the like consisting in the combination of elements having features thereof as follows: the two ends to be coupled by a laterally produced engagement with each other and a sleeve positionable over the joint thus formed whereby said engagement and coupled relation are maintained; one of said ends being provided with a gap extending longitudinally thereinto and having inwardly converging walls formed into alternate, transversely extending grooves and lands, the external walls of said gap being formed into an upwardly diverging taper, and above said taper into an external screwthread; the other of said ends being of uniform diameter throughout its length but is otherwise formed into a counterpart tenon for lateral insertion into and occupancy of said gap whereby the coupled relation of said ends is attained; said sleeve being positionable over the coupled joint thus formed, the bore of which sleeve conforms to the periphery of the lower portion of said first mentioned end up to and including said screw thread for the stated cooperation therewith, whereby the inner opposing walls of said gap may be caused to firmly grip said tenon and also insure and maintain the alignment of the ends so coupled, said sleeve being readily removable from said ends.

7. A coupling organization for rods, shafting and like elements consisting in combination of the two ends of such elements to be coupled and a sleeve positionable over the coupled joint whereby said coupled relation is maintained; one of said ends being provided with a gap extending longitudinally thereinto, the walls of said gap being disposed in inwardly converging relation and having as features thereof transversely disposed lands and grooves, the outer walls of the jaws which are formed by said gap being provided with a downwardly converging taper; the end of the other of said rods having a uniform diameter which is slightly smaller than the smallest diameter of said jaws and formed into a counterpart tenon for lateral insertion into and occupancy of said gap, and a sleeve having a bore which is in close conformity to the peripheral walls of the adjacent portions of said ends in their coupled relation, positionable over the coupled joint with the walls of its bore in retentive engagement with the adjacent portions of the walls of said coupled members, said sleeve being readily removable from either of said ends when the joint is disconnected.

HARRY A. SNYDER.